(12) United States Patent
Matwey et al.

(10) Patent No.: US 8,312,729 B2
(45) Date of Patent: Nov. 20, 2012

(54) FLOW DISCOURAGING SYSTEMS AND GAS TURBINE ENGINES

(75) Inventors: Mark Matwey, Phoenix, AZ (US); David Jan, Fountain Hills, AZ (US)

(73) Assignee: Honeywell International Inc., Morristown, NJ (US)

( * ) Notice: Subject to any disclaimer, the term of this patent is extended or adjusted under 35 U.S.C. 154(b) by 875 days.

(21) Appl. No.: 12/563,622

(22) Filed: Sep. 21, 2009

(65) Prior Publication Data

US 2011/0067414 A1   Mar. 24, 2011

(51) Int. Cl.
*F02C 7/12* (2006.01)

(52) U.S. Cl. .......................................... 60/806; 415/115

(58) Field of Classification Search .................. 60/796, 60/805, 806; 415/115, 116, 173.1, 173.3, 415/173.5, 191, 208.2, 209.2, 210.1; 416/95, 416/96 A, 97 R, 97 A
See application file for complete search history.

(56) References Cited

U.S. PATENT DOCUMENTS

| | | | |
|---|---|---|---|
| 3,447,741 A | 6/1969 | Havette et al. | |
| 3,791,758 A * | 2/1974 | Jenkinson | 415/116 |
| 4,832,567 A | 5/1989 | Bessay | |
| 5,211,536 A | 5/1993 | Ackerman et al. | |
| 5,224,822 A | 7/1993 | Lenahan et al. | |
| 5,545,004 A | 8/1996 | Ho et al. | |
| 5,628,193 A | 5/1997 | Kington et al. | |
| 5,709,530 A | 1/1998 | Cahill et al. | |
| 6,077,035 A * | 6/2000 | Walters et al. | 415/115 |
| 6,109,868 A | 8/2000 | Bulman et al. | |
| 6,419,446 B1 | 7/2002 | Kvasnak et al. | |
| 6,481,959 B1 | 11/2002 | Morris et al. | |
| 6,506,016 B1 | 1/2003 | Wang | |
| 6,533,542 B2 | 3/2003 | Sugishita et al. | |
| 6,612,809 B2 | 9/2003 | Czachor et al. | |
| 6,672,832 B2 | 1/2004 | Leeke et al. | |
| 6,923,616 B2 | 8/2005 | McRae, Jr. et al. | |
| 6,942,445 B2 | 9/2005 | Morris et al. | |
| 7,114,339 B2 * | 10/2006 | Alvanos et al. | 60/806 |
| 7,189,055 B2 * | 3/2007 | Marini et al. | 415/115 |
| 7,465,152 B2 | 12/2008 | Nigmatulin | |
| 7,578,653 B2 * | 8/2009 | Klasing et al. | 415/115 |
| 2006/0269398 A1 * | 11/2006 | Marini et al. | 415/115 |
| 2007/0025854 A1 | 2/2007 | Moore et al. | |
| 2008/0080970 A1 | 4/2008 | Cooke et al. | |

* cited by examiner

*Primary Examiner* — Phutthiwat Wongwian
(74) *Attorney, Agent, or Firm* — Ingrassia Fisher & Lorenz, P.C.

(57) ABSTRACT

A flow discouraging system includes a stator assembly, fins, and a rotor assembly. The stator assembly includes stationary components forming a side wall including an annular groove defined by an outer axially-extending surface, an inner axially-extending surface, and a radial surface. One or more outer axial fins disposed in the annular groove extend along the outer axially-extending surface of the side wall. One or more inner axial fins disposed in the annular groove extend along the inner axially-extending surface of the side wall. One or more radial fins disposed in the annular groove extend axially from the radial surface of the side wall. The rotor assembly is disposed adjacent to and is spaced apart from the stator assembly to form a portion of a cavity and includes an annular rim extending at least partially into the annular groove and disposed between the outer and inner axial fins.

19 Claims, 9 Drawing Sheets

FLOW DISCOURAGING SYSTEMS AND GAS TURBINE ENGINES

STATEMENT REGARDING FEDERALLY SPONSORED RESEARCH OR DEVELOPMENT

This inventive subject matter was made with Government support under DAAH100320007 awarded by the United States Army. The Government has certain rights in this inventive subject matter.

TECHNICAL FIELD

The inventive subject matter generally relates to gas turbine engines, and more particularly relates to enhanced flow discouraging systems for use in gas turbine engines.

BACKGROUND

A turbofan gas turbine engine may be used to power aircraft and may include, for example, a fan section, a compressor section, a combustion section, a turbine section, and an exhaust section, where each section has components that are mounted to a rotor. The fan section induces air from the surrounding environment into the engine and accelerates a fraction of the air toward the compressor section. The remaining fraction of air is accelerated into and through a bypass plenum, and out the exhaust section.

The compressor section, which may include a high pressure compressor and a low pressure compressor, raises the pressure of the air it receives from the fan section to a relatively high level. The compressed air then enters the combustion section, where a ring of fuel nozzles injects a steady stream of fuel into a plenum. The injected fuel is ignited to produce high-energy, hot combusted air. The air then flows into and through the turbine section causing turbine blades on a rotating disk to rotate and generate energy. This energy is used to power the fan and compressor sections. The air exiting the turbine section is exhausted from the engine via the exhaust section, and the energy remaining in the exhaust air aids the thrust generated by the air flowing through the bypass plenum.

During operation, the turbine blades, the rotating disk, and other components of the turbine section may be exposed to the hot combusted air. To prevent the turbine section components from overheating, a cooling system may be included. In some engines, cooling air extracted from other parts of the engine, such as from the compressor section, may be bled at compressor-discharge conditions and directed to the turbine section components. To improve cooling effectiveness of the cooling air, a flow rate of the cooling air may be increased. However, because the extraction of cooling air does not contribute to providing power to the turbine for engine operation, providing an excessive quantity of cooling air flow may undesirably increase engine fuel consumption, which may, in turn, reduce the power output of the gas turbine engine. These issues may be exacerbated in the case of small gas turbine engines (e.g., turbine engines having turbine inlet corrected airflows that are less than 1 lbm/sec). In particular, gaps between rotating and non-rotating components of small gas turbine engines, as well as seals included in these engines, are generally designed to minimize clearances therebetween and to have minimum tolerances. Therefore, an amount of gas leakage within small gas turbine engines may not decrease, despite scale-down of engine dimensions.

Accordingly, it is desirable to provide an improved system for cooling the components of an engine turbine section, including an engine turbine section of a small gas turbine engine. In addition, it is desirable for the improved system to cool engine components with minimal effect on engine fuel consumption. Moreover, it is desirable for the improved system to be relatively simple to implement. Furthermore, other desirable features and characteristics of the inventive subject matter will become apparent from the subsequent detailed description of the inventive subject matter and the appended claims, taken in conjunction with the accompanying drawings and this background of the inventive subject matter.

BRIEF SUMMARY

Flow discouraging systems and gas turbine engines have been provided.

In an embodiment, by way of example only, a flow discouraging system includes a stator assembly, outer axial fins, inner axial fins, radial fins, and a rotor assembly. The stator assembly includes one or more stationary components forming a side wall, and the side wall includes an annular groove defined by an outer axially-extending surface, an inner axially-extending surface, and a radial surface extending between the outer and inner axially-extending surfaces. One or more outer axial fins are disposed in the annular groove and extend along the outer axially-extending surface of the side wall. One or more inner axial fins are disposed in the annular groove and extend along the inner axially-extending surface of the side wall. One or more radial fins are disposed in the annular groove and extend axially from the radial surface of the side wall. The rotor assembly is disposed adjacent to and is spaced apart from the stator assembly to form a portion of a cavity. The rotor assembly includes an annular rim extending at least partially into the annular groove and is disposed between the one or more outer axial fins and the one or more inner axial fins.

In another embodiment, by way of example only, a gas turbine engine includes a compressor section, a combustion section adjacent to the compressor section, and a turbine section adjacent to the combustion section. The turbine section includes a stator assembly including one or more stationary components forming a side wall, the side wall including an annular groove defined by an outer axially-extending surface, an inner axially-extending surface, and a radial surface extending between the outer and inner axially-extending surfaces, a plurality of outer axial fins disposed in the annular groove and extending along the outer axially-extending surface of the side wall, a plurality of inner axial fins disposed in the annular groove and extending along the inner axially-extending surface of the side wall, a plurality of radial fins disposed in the annular groove extending axially from the radial surface of the side wall, a rotor assembly disposed adjacent to and spaced apart from the stator assembly to form a portion of a cavity, the rotor assembly including an annular rim extending at least partially into the annular groove and disposed between the outer axial fin and the inner axial fin, and the cavity in flow communication with the compressor section, and a main flowpath surrounding the stator assembly and the rotor assembly, the main flowpath in flow communication with the combustion section.

BRIEF DESCRIPTION OF THE DRAWINGS

The inventive subject matter will hereinafter be described in conjunction with the following drawing figures, wherein like numerals denote like elements.

DETAILED DESCRIPTION

The following detailed description is merely exemplary in nature and is not intended to limit the inventive subject matter or the application and uses of the inventive subject matter. In particular, although the inventive subject matter is described in the context of turbofan gas turbine engines, the inventive subject matter may be implemented in turbojet, turboprop, turboshaft, auxiliary power generation and pneumatic pressure generation gas turbine engines or any other engine in which a flow discouraging system may be useful. Furthermore, there is no intention to be bound by any theory presented in the preceding background or the following detailed description.

Figure 1:
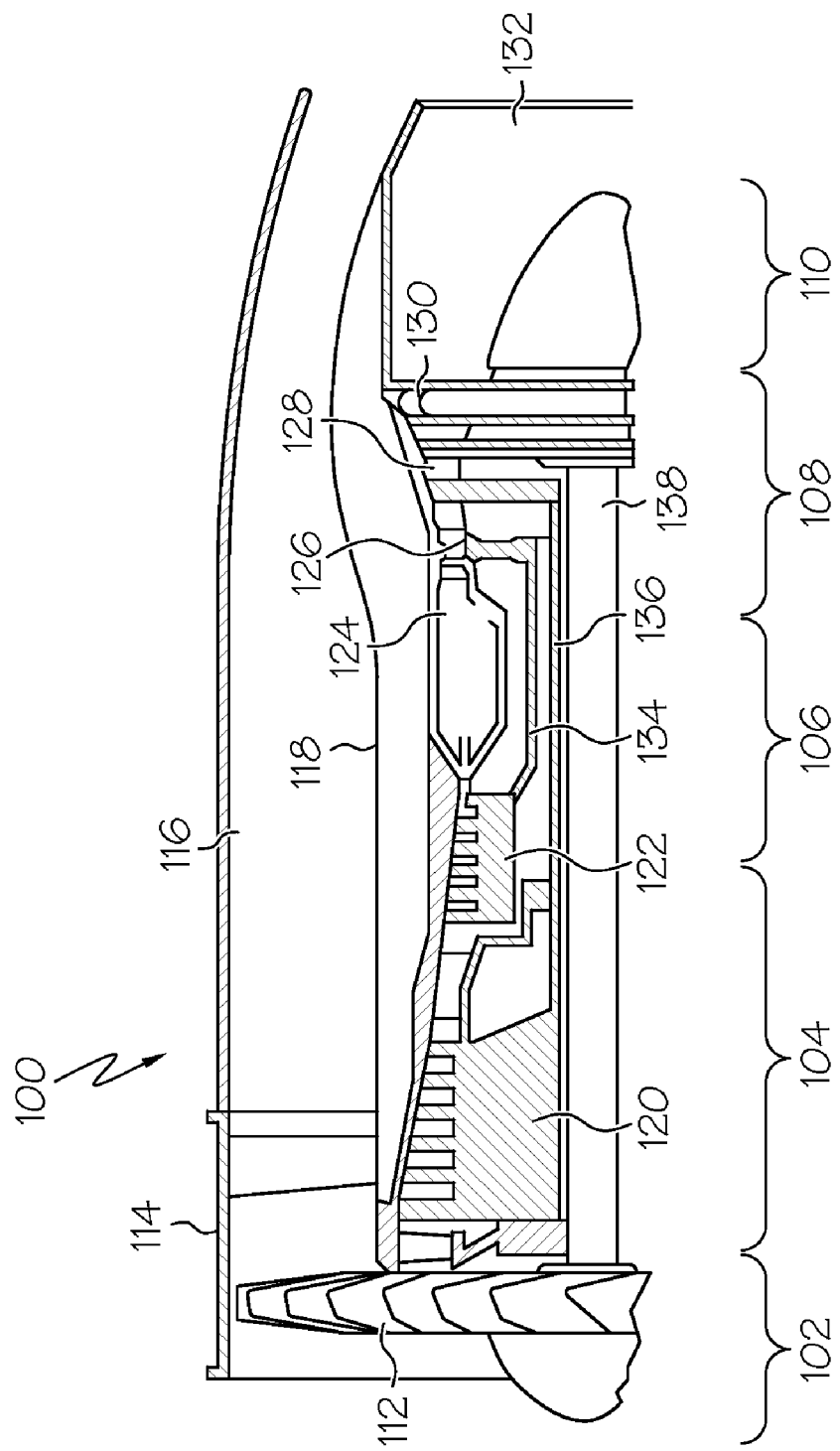
FIG. 1 is a simplified, schematic of a gas turbine engine, according to an embodiment.

FIG. 1 is a simplified, schematic of a gas turbine engine 100, according to an embodiment. In accordance with an embodiment, the gas turbine engine 100 may include a system that maintains a flow of hot combusted air along a designated flowpath by reducing or preventing the leakage of the hot combusted air into spaces between rotating and non-rotatable components of the gas turbine engine 100. In this way, an amount of cooling air supplied into the spaces for cooling the components of the gas turbine engine 100 may be reduced, as compared with the amount cooling air used in conventional gas turbine engines. The use of a reduced amount of cooling air may result in an increase in engine efficiency.

In any case, in general, the gas turbine engine 100 includes an intake section 102, a compressor section 104, a combustion section 106, a turbine section 108, and an exhaust section 110. The intake section 102 includes a fan 112, which is mounted in a fan case 114. The fan 112 draws air into the intake section 102 and accelerates it. A fraction of the accelerated air exhausted from the fan 112 is directed through a bypass section 116 disposed between the fan case 114 and an engine bypass duct 118, and provides a forward thrust. The remaining fraction of air exhausted from the fan 112 is directed into the compressor section 104.

The compressor section 104 includes an intermediate pressure compressor 120 and a high pressure compressor 122. The intermediate pressure compressor 120 raises the pressure of the air directed into it from the fan 112, and directs the compressed air into the high pressure compressor 122. The high pressure compressor 122 compresses the air still further, and directs the high pressure air into the combustion section 106. In the combustion section 106, which includes an annular combustor 124, the high pressure air is mixed with fuel and combusted. The hot combusted air is then directed into the turbine section 108.

The turbine section 108 includes a high pressure turbine 126, an intermediate pressure turbine 128, and a low pressure turbine 130 disposed in axial flow series. The hot combusted air from the combustion section 106 expands through the turbines 126, 128, 130 causing each to rotate. The air is then exhausted through a propulsion nozzle 132 disposed in the exhaust section 110, providing additional forward thrust. As each turbine 126, 128, 130 rotates, each drives equipment in the engine 100 via concentrically disposed shafts or spools. Specifically, the high pressure turbine 126 drives the high pressure compressor 122 via a high pressure shaft 134, the intermediate pressure turbine 128 drives the intermediate pressure compressor 120 via an intermediate pressure shaft 136, and the low pressure turbine 130 drives the fan 112 via a low pressure shaft 138.

Figure 2:
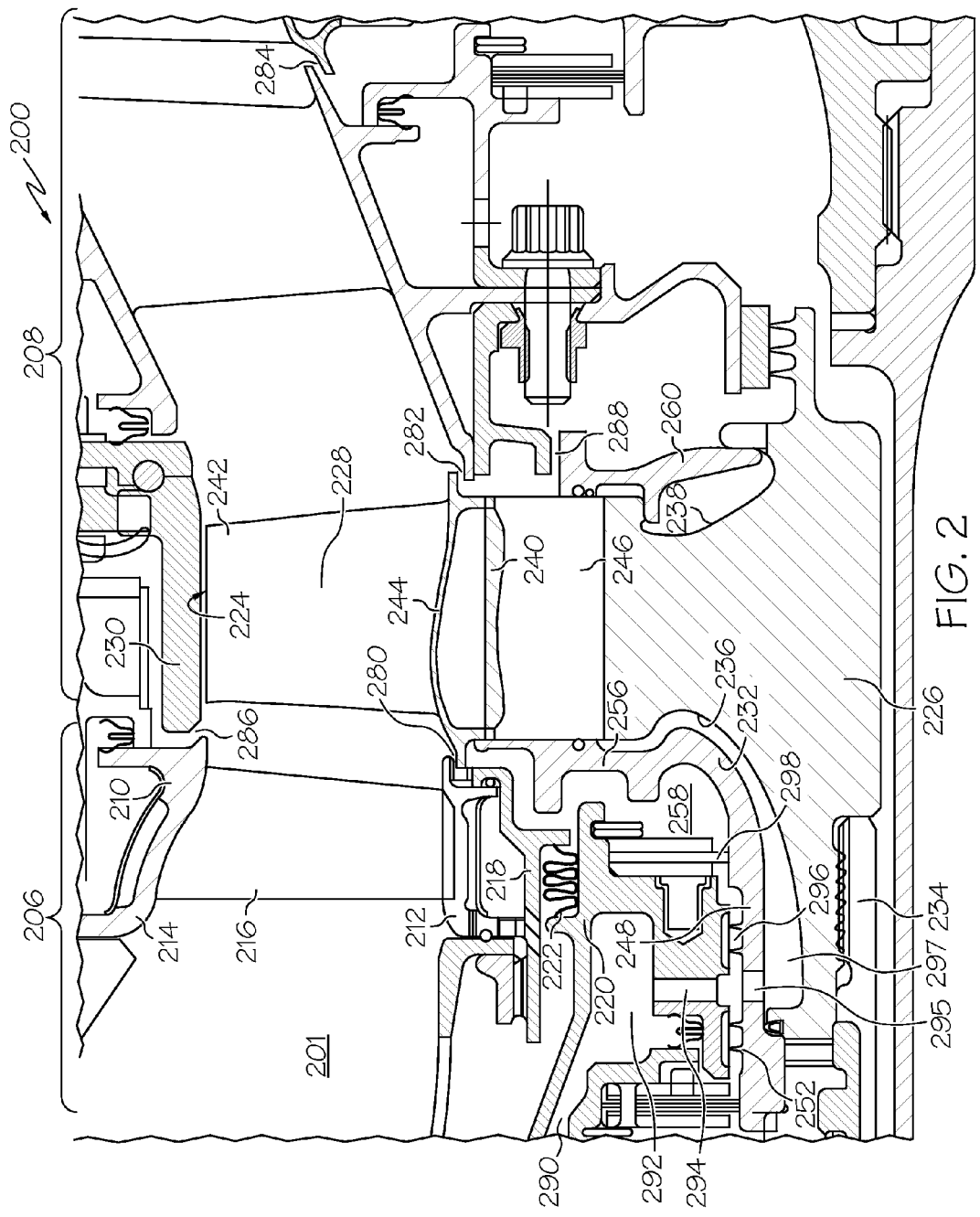
FIG. 2 is a cross-sectional view of a portion of a turbine section of a gas turbine engine, according to an embodiment.

FIG. 2 is a cross-sectional view of a portion of a gas turbine engine 200, according to an embodiment. In accordance with an embodiment, the gas turbine engine 200 includes a main flowpath 201 that extends between a stator assembly and a rotor assembly. In an embodiment, the stator assembly may comprise components from a combustion section 206, while the rotor assembly may comprise components from a turbine section 208 so that the main flowpath 201 may receive a gas flow from a combustor of the combustion section 206. In an example, the components of the combustion section 206 may include a nozzle 210 configured to direct hot combusted air to the turbine section 208. The nozzle 210 has an inner ring 212, an outer ring 214, and a plurality of stationary vanes 216 (only one of which is shown). The plurality of stationary vanes 216 extend between the inner and outer rings 212, 214 and are configured to direct flow of the hot combusted air toward the rotor assembly. According to an embodiment, the inner ring 212 may be mounted to a static support structure 218, which is disposed around a Tangential On Board Injector (TOBI) housing 220. The static support structure 218 may be ring-shaped and may surround the TOBI housing 220. To prevent air leakage between the static support structure 218 and the TOBI housing 220, a seal 222 may be included.

The rotor assembly is disposed adjacent to and is spaced apart from the stator assembly and may comprise a turbine wheel assembly 224 including a hub 226, a plurality of blades 228 (only one of which is shown), a forward cover plate 232, and an aft cover plate 260, in an embodiment. In accordance with an embodiment, the hub 226 may be mounted to a shaft 234 and includes a forward face 236 and an aft face 238. The plurality of blades 228 are attached to an outer diameter of the hub 226, and cause the hub 226 to rotate when hot combusted air impinges on the blades 228. Each blade 228 includes a shank 240, an airfoil 242, a platform 244, and a root 246. According to an embodiment, the platform 244 is configured to radially contain airflow from the nozzle 210 along the main flowpath 201. The root 246 is used to attach the blade 228 to the hub 226. In an embodiment, the blades 228 are surrounded by the shroud 230, which defines a portion of the main flowpath with the platform 244.

In an embodiment, the forward cover plate 232 may comprise a portion of a TOBI system that supplies cooling air to cool the blades 228. The forward cover plate 232 includes an axial section 248 for mounting to the hub 226, in an embodiment. In another embodiment, the axial section 248 is disposed radially inwardly from the TOBI housing 220, and one or more seals 252 may be disposed between the axial section 248 and the TOBI housing 220 to reduce air leakage. According to an embodiment, the forward cover plate also includes a radial plate 256, which may extend along the forward face 236 of the hub 226. In an embodiment, an outer periphery of the radial plate 256 may be coupled to the hub 226.

To provide cooling air to the blades 228, the cooling air may be extracted from the compressor section (e.g., compressor section 104 of FIG. 1) and may be diverted into a TOBI cooling air supply circuit 290. The TOBI cooling air supply circuit 290 may deliver cooling air into a TOBI plenum 292. From the TOBI plenum 292, the cooling air may pass through a plurality of TOBI holes 294 and through a plurality of holes 295 in the forward cover plate 232. The cooling air may then flow into a cavity 297 between the forward cover plate 232 and the hub 226. In an embodiment, the cavity 297 defines a pathway along which cooling air can travel. The cooling air may enter the hub 226, passing through the blade root 246 to cool the blades 228.

Cooling air may alternatively or additionally be provided to spaces formed between the stator and rotor assemblies to maintain temperatures of the stator and rotor assembly components at acceptable levels. For example, with reference to FIG. 2, cooling air may be extracted from the compressor section (e.g., compressor section 104 of FIG. 1) and diverted into the TOBI cooling air supply circuit 290. In an embodiment, the TOBI cooling air supply circuit 290 delivers cooling air into the TOBI plenum 292, and the cooling air passes through the plurality of TOBI holes 294 and past a set of metering seals 296, 298. The cooling air then may be directed into a cavity 258 formed between the stator assembly and the rotor assembly. In an embodiment, the stator assembly may include components of the combustion section 206, and rotor assembly may include the components of the turbine wheel assembly 224. In any case, the cavity 258 defines a pathway along which cooling air can travel to purge hot combusted air from the cavity 258, in an embodiment.

In an embodiment, the cavity 258 includes an inner portion and an outer portion. In an embodiment, the inner portion of the cavity 258 may be defined between the TOBI housing 220 and static support structure 218 and the forward cover plate 232.

The TOBI housing 220 and the static support structure 218 are sufficiently spaced from the forward cover plate 232 to allow for the rotor assembly to rotate without contacting the TOBI housing 220 and to allow low velocity cooling air (e.g., cooling air have a velocity in a range of about 0.1 to about 0.3 Mach number) to flow radially outward along the cavity 258 pathway to purge hot combusted air from the cavity 258.

In the outer portion of the cavity 258, which includes an exit opening 280, a flow discouraging device may be included to minimize hot combusted air ingestion. In an embodiment, the flow discouraging device may comprise a single axial overlap between the inner ring 212 of the nozzle 210 and the rotor platform 244 of the blade 228, where a small radial gap is created which causes an area restriction and thus discourages airflow. In this embodiment, a flow discouraging affect may discourage hot combusted air ingestion from the main flowpath 201 into the cavity 258, as well as discourage cooling air from escaping from the cavity 258 and into the main flowpath 201. Though depicted as being included between the inner ring 212 and platform 244 of the blade 228, the flow discouraging device may also or alternatively exist in other locations of a gas turbine engine (e.g., at locations 282, 284).

In other embodiments, the flow discouraging device may have another configuration that may produce the flow discouraging effect, for example, by using chambers and/or multiple axial overlaps. In an example, as shown in FIG. 2, the flow discouraging device may include a double axial overlap configuration, commonly referred to as a "fish-mouth". In an embodiment, the fish-mouth may be formed in the outer portion of the cavity 258 and may be defined between the static support structure 218 and inner ring 212 of the nozzle 210 and the platform 244 of the blade 228.

Figure 3:
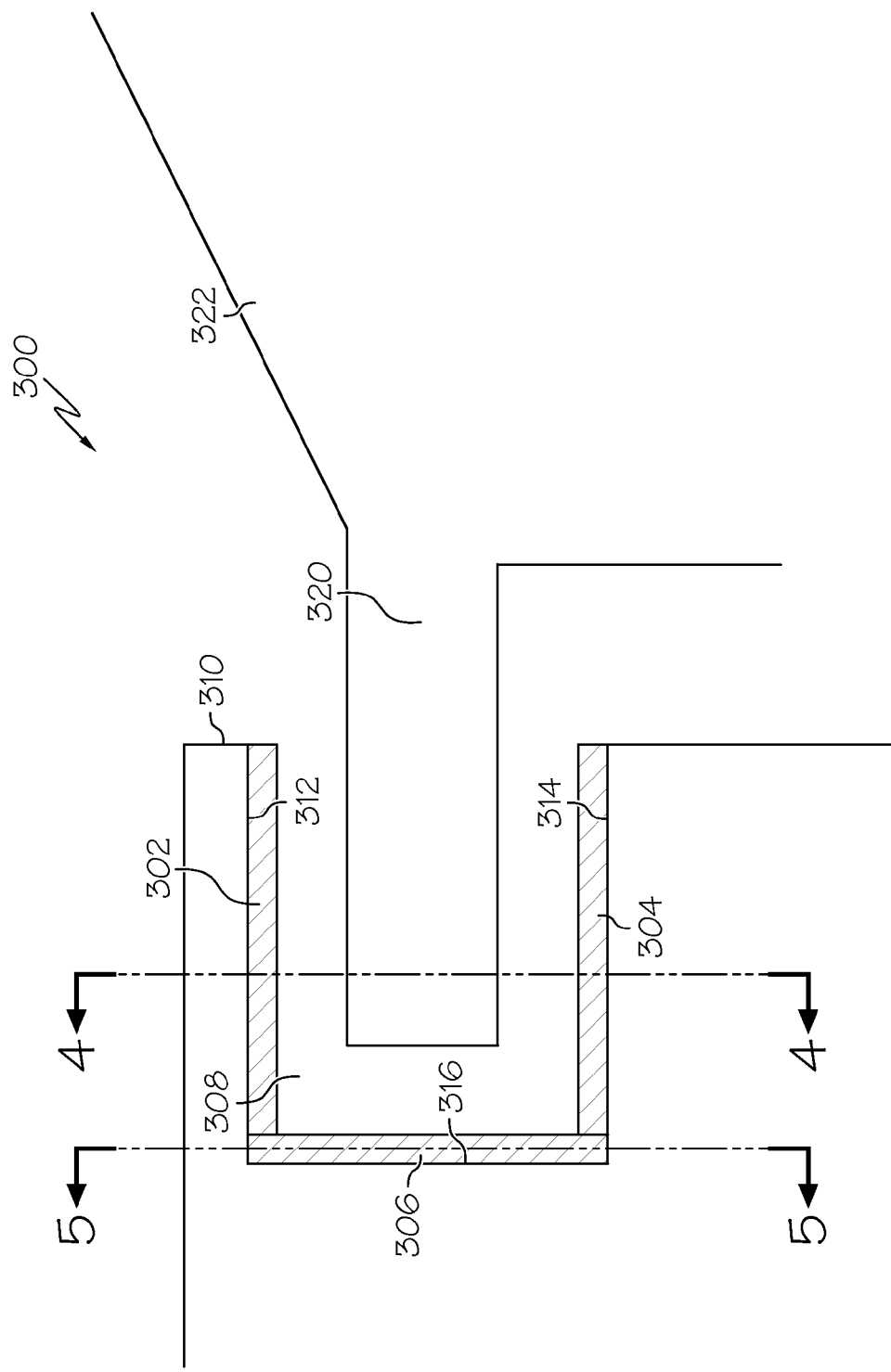
FIG. 3 is a close-up view of an enhanced flow discouraging system, according to an embodiment.

In another embodiment, the fish-mouth flow discouraging system may be enhanced. FIG. 3 is a close-up view of an enhanced flow discouraging system 300, according to an embodiment. In an embodiment, the enhanced flow discouraging system 300 provides a relatively torturous flowpath to the cooling air and the hot combusted air and, in this regard, may include outer axial fins 302, inner axial fins 304, and radial fins 306 (each of which only one is shown). The axial fins 302, 304 and radial fins 306 may be disposed within an annular groove 308 formed in a side wall 310 of the stator assembly. The side wall 310 may extend radially inwardly from a main flowpath of the engine (e.g., main flowpath 201 of FIG. 2), in an embodiment. In an example, the side wall 310 may comprise more than one component of the stator assembly, such as an inner ring of a nozzle (e.g., inner ring 212 of nozzle 210 in FIG. 2) and a static support structure (e.g., static support structure 218 of FIG. 2). In other embodiments, the side wall 310 may comprise a single component. In an embodiment, although the side wall 310 is depicted as being disposed between a combustion section 206 (FIG. 2) and a turbine section 208 (FIG. 2), the side wall 310 may be alternatively disposed in other locations, positioned radially inwardly or radially outwardly relative to the main flowpath.

In any case, the annular groove 308 is defined by an outer axially-extending surface 312, an inner axially-extending surface 314, and a radial surface 316 extending between the outer and inner axially-extending surfaces 312, 314. According to an embodiment, the annular groove 308 may have a radial height in a range of about 1.9 mm to about 4.7 mm and a depth in a range of about 2.9 mm to about 7.0 mm. In another embodiment, the dimensions of the annular groove 308 may be greater or less than the aforementioned ranges. In still another embodiment, the annular groove walls 312, 314 and the annular rim 320 may be substantially parallel to each other and all disposed at an angle in a range of about 0° to about 45° relative to the centerline. In still other embodiments, the angle may be greater or less than the aforementioned range.

The outer axial fins 302 extend along the outer axially-extending surface 312 in an embodiment. In accordance with an embodiment, the outer axial fins 302 extend substantially parallel to a centerline (not shown) of the stator assembly. In another embodiment, the outer axial fins 302 may extend at an angle relative to the centerline. For example, the angle may be in a range of about −15° to about 15° relative to the centerline. In other embodiments, the angle may be greater or less than the aforementioned range. In still another embodiment, all of the outer axial fins 302 are substantially identically angled relative to the centerline. In still yet other embodiments, the outer axial fins 302 may not be identically angled relative to the centerline.

The inner axial fins 304 extend along the inner axially-extending surface 314 in an embodiment. In accordance with an embodiment, the inner axial fins 304 extend substantially parallel to a centerline (not shown) of the stator assembly. In another embodiment, the inner axial fins 304 may extend at an angle relative to the centerline. For example, the angle may be in a range of about −15° to about 15° relative to the centerline. In other embodiments, the angle may be greater or less than the aforementioned range. In still another embodiment, all of the inner axial fins 304 are substantially identically angled relative to the centerline. In still yet other embodiments, the inner axial fins 304 may not be identically angled relative to the centerline. In accordance with an embodiment, the inner axial fins 304 may extend at an angle relative to the centerline, where the angle is substantially identical to an angle at which the outer axial fins 302 extend. In other embodiments, the fins 302, 304 may not extend at an identical angle relative to the centerline.

According to an embodiment, the outer and inner axial fins 302, 304 are dimensioned to provide a radial clearance that is sufficiently sized to allow a portion of a component of the rotor assembly to extend into the gap between the outer axial fins and the inner axial fins 302, 304, and to remain spaced apart from the rotor assembly component. In an embodiment, each outer axial fin 302 has a length in a range of about 2.9 mm to about 7.0 mm, a height in a range of about 1.9 mm to about 4.7 mm, and a thickness of about 0.25 mm to about 1.25 mm, and each inner axial fin 304 has a length in a range of about 2.9 mm to about 7.0 mm, a height in a range of about 1.9 mm to about 4.7 mm, and a thickness of about 0.25 mm to about 1.25 mm. In an embodiment, the outer and inner axial fins 302, 304 may be substantially identically dimensioned. In another embodiment, the outer axial fins 302 may be substantially identically dimensioned, and the inner axial fins 304 may have dimensions that are different than those of the outer axial fins 302. In still another embodiment, the outer axial fins 302 may not be identically dimensioned, and/or the inner axial fins 304 may not be identically dimensioned. In any case, the outer and inner axial fins 302, 304 may have dimensions that are larger or smaller than the aforementioned ranges, as the particular dimensions may depend on the specific dimensions of the annular groove 308 and the component of the rotor assembly.

Figure 4:
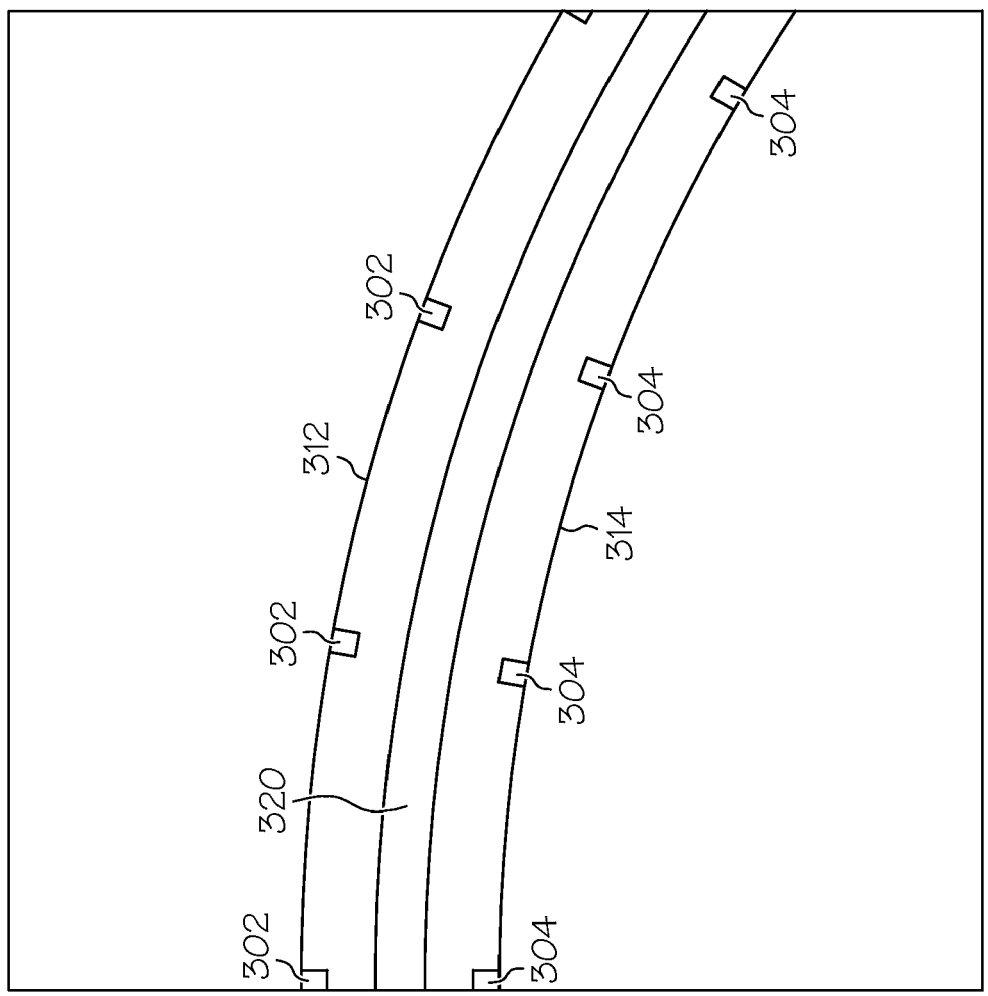
FIG. 4 is a cross-sectional view of the enhanced flow discouraging system of FIG. 3 taken along line 4-4, according to an embodiment.

FIG. 4 is a cross-section view of the enhanced flow discouraging system 300 taken along line 4-4 of FIG. 3, according to an embodiment. Here, the outer axial fins 302 and corresponding inner axial fins 304 are radially aligned with each other. However, in other embodiments, the outer and inner axial fins 302, 304 may not be radially aligned. In an embodiment, the enhanced flow discouraging system 300 may include 60 to 100 outer axial fins and 60 to 100 inner axial fins. In another embodiment, the number of outer and inner axial fins 302, 304 may be greater or less than the aforementioned ranges. According to an embodiment, the total number of outer axial fins 302 may be equal to the total number of inner axial fins 304. In other embodiments, the total numbers of each of the axial fins 302, 304 may not be equal. The outer axial fins 302 and/or the inner axial fins 304 may be spaced substantially evenly around the annular groove 308, in an embodiment. In another embodiment, the outer axial fins 302 and/or the inner axial fins 304 may be unevenly spaced around the annular groove 308. In an embodiment, the outer axial fins and inner axial fins 302, 304, may have no tilt with respect to the direction of rotation of the rotor blade 228 (FIG. 2). In other embodiments, the axial fins, either outer and/or inner axial fins 302, 304, may be tilted in a range of about 0° to about 45° in the opposite direction of rotation of the rotor blade 228. In other embodiments, the tilt angle may be greater or less than the aforementioned range. In an embodiment, the outer and inner axial fins 302, 304, both have a square cross-sectional shape. In other embodiments, the cross-sectional shape may be different than square.

Figure 5:
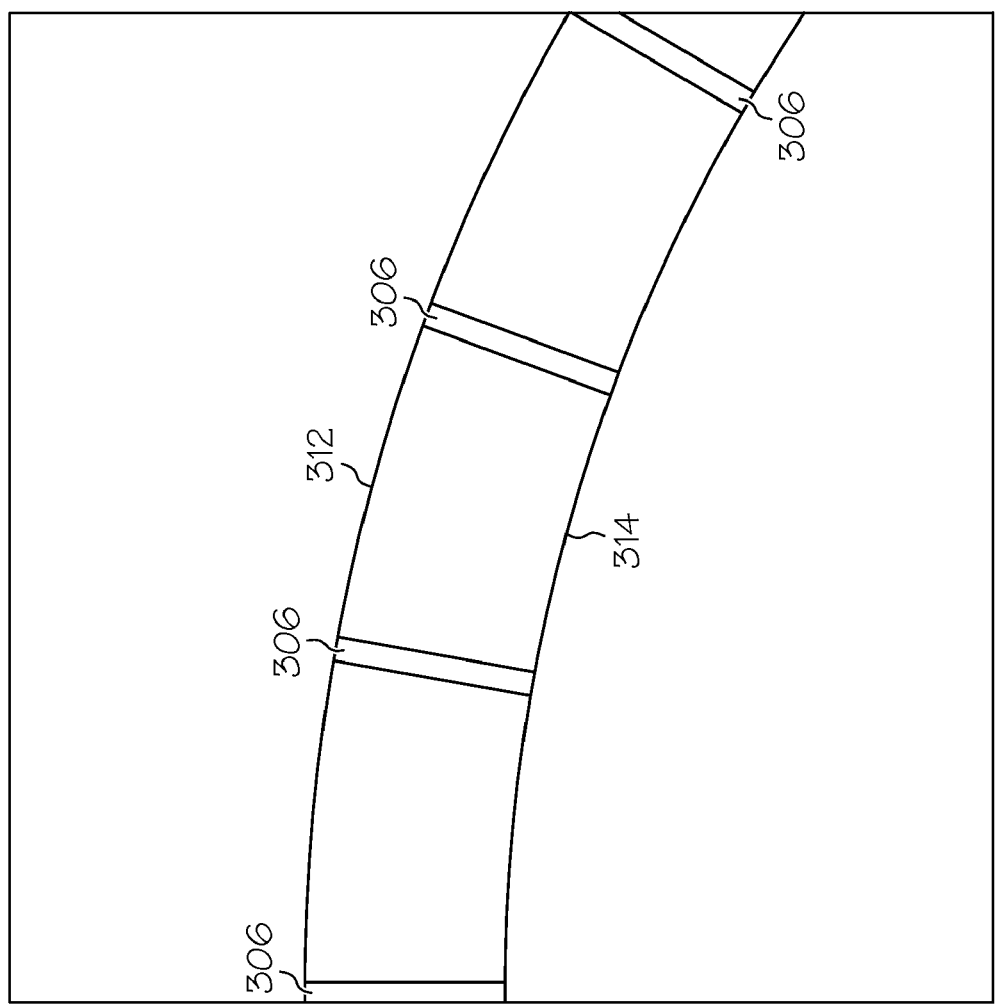
FIG. 5 is a cross-sectional view of the enhanced flow discouraging system of FIG. 3 taken along line 5-5, according to an embodiment.

FIG. 5 is a cross-section view of the enhanced flow discouraging system 300 taken along line 5-5 of FIG. 3, according to an embodiment. In accordance with an embodiment, the radial fins 306 extend radially from the inner surface 314 to the outer surface 312. In an embodiment, the radial fins 306 extend substantially perpendicular with the centerline. In other embodiments, the radial fins 306 may not extend substantially perpendicular to the centerline. In an embodiment, the enhanced flow discouraging system 300 may include 60 to 100 radial fins 306. In another embodiment, the number of radial fins 306 may be greater or less than the aforementioned range. According to an embodiment, the total number of radial fins 306 may be equal to the total number of outer axial fins 302 (FIG. 4) and/or inner axial fins 304 (FIG. 4). In other embodiments, the total number of axial and radial fins 302, 304, 306 may not be equal. The radial fins 306 may be spaced evenly around the annular groove 308 (FIG. 4), in an embodiment. In another embodiment, the radial fins 306 may be unevenly spaced around the annular groove 308. In an embodiment, the radial fins 306 may have no tilt with respect to the direction of rotation of the rotor blade 228. In other embodiments, the radial fins 306 may be in tilted in a range of about 0° to about 45° in the opposite direction of rotation of the rotor blade 228. In other embodiments, the tilt angle may be greater or less than the aforementioned range. In an embodiment, the radial fins 306 have a square cross-sectional shape. In other embodiments, the cross-sectional shape may be different than square.

In an embodiment, the radial fins 306 may have an axial length in a range of about 1.9 mm to about 4.7 mm and a thickness of about 0.25 mm to about 1.25 mm. In another embodiment, the radial fins 306 may be longer or shorter or thicker or thinner than the aforementioned ranges. According to another embodiment, the radial fins 306 may extend along the entire length of the radial surface 316 or may extend along a portion of the radial surface 316. In an embodiment, the radial fins 306 may have a radial height in a range of about 2.9 mm to about 7.0 mm; however, in other embodiments, the radial height may be greater or less than the aforementioned ranges.

Returning to FIG. 3, in an embodiment, the outer axial fins 302 may extend along the entire length of the axial surface 312 or may extend along a portion of the axial surface 312. In an embodiment, the inner axial fins 304 may extend along the entire length of the axial surface 314 or may extend along a portion of the axial surface 314.

Figure 6:
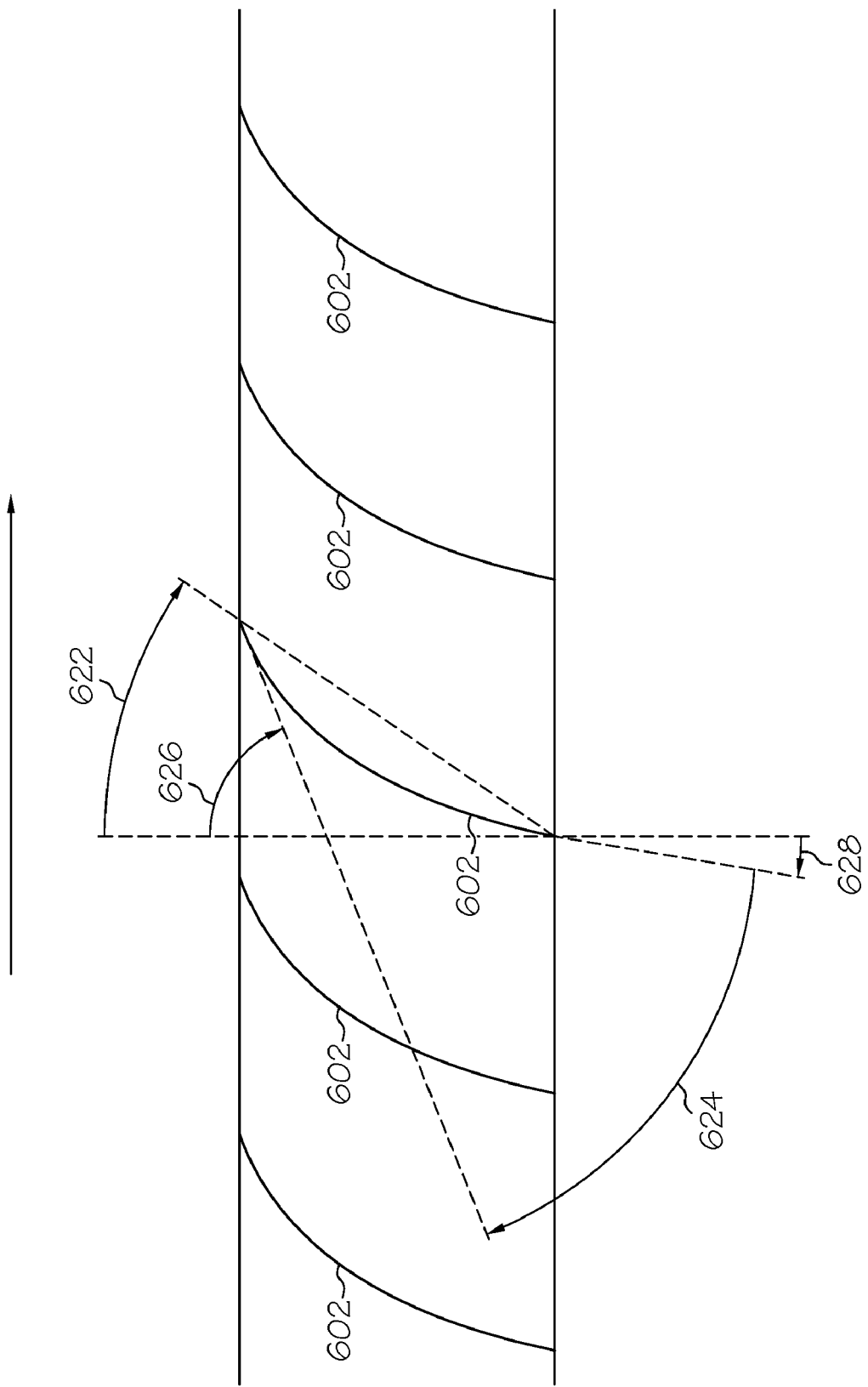
FIG. 6 is a two-dimensional view of the outer axial fins for the enhanced flow discouraging system of FIG. 3, according to an embodiment.

FIG. 6 is a two-dimensional view of the outer axial fin 602 of the enhanced flow discouraging system 300, according to an embodiment. Here, the outer axial fins 602 are staggered and have a stagger angle 622, a camber angle 624, and fin angles 626, 628. In an embodiment, the outer axial fins 602 may have a stagger angle 622 in a range of about 0° to about 60°. In other embodiments, the stagger angle 622 may be less than or greater than the aforementioned range. In an embodiment, the outer axial fins 602 may have a camber angle 624 in a range of about 0° to about 45°. In other embodiments, the camber angle 624 may be less than or greater than the aforementioned range. In another embodiment, the outer axial fins 602 may have fin angles 626, 628 in a range of about 0° to about 45°. In still other embodiments, the fin angles 626, 628 may be less than or greater than the aforementioned range. Further, one or more of the outer axial fins 602 may have a stagger angle 622 and/or a camber angle 624 that is different from another one of the outer axial fins 602. Further still, one or more of the outer axial fins 602 may have fin angles 626, 628 that are different from another one of the outer axial fins 602.

Figure 7:
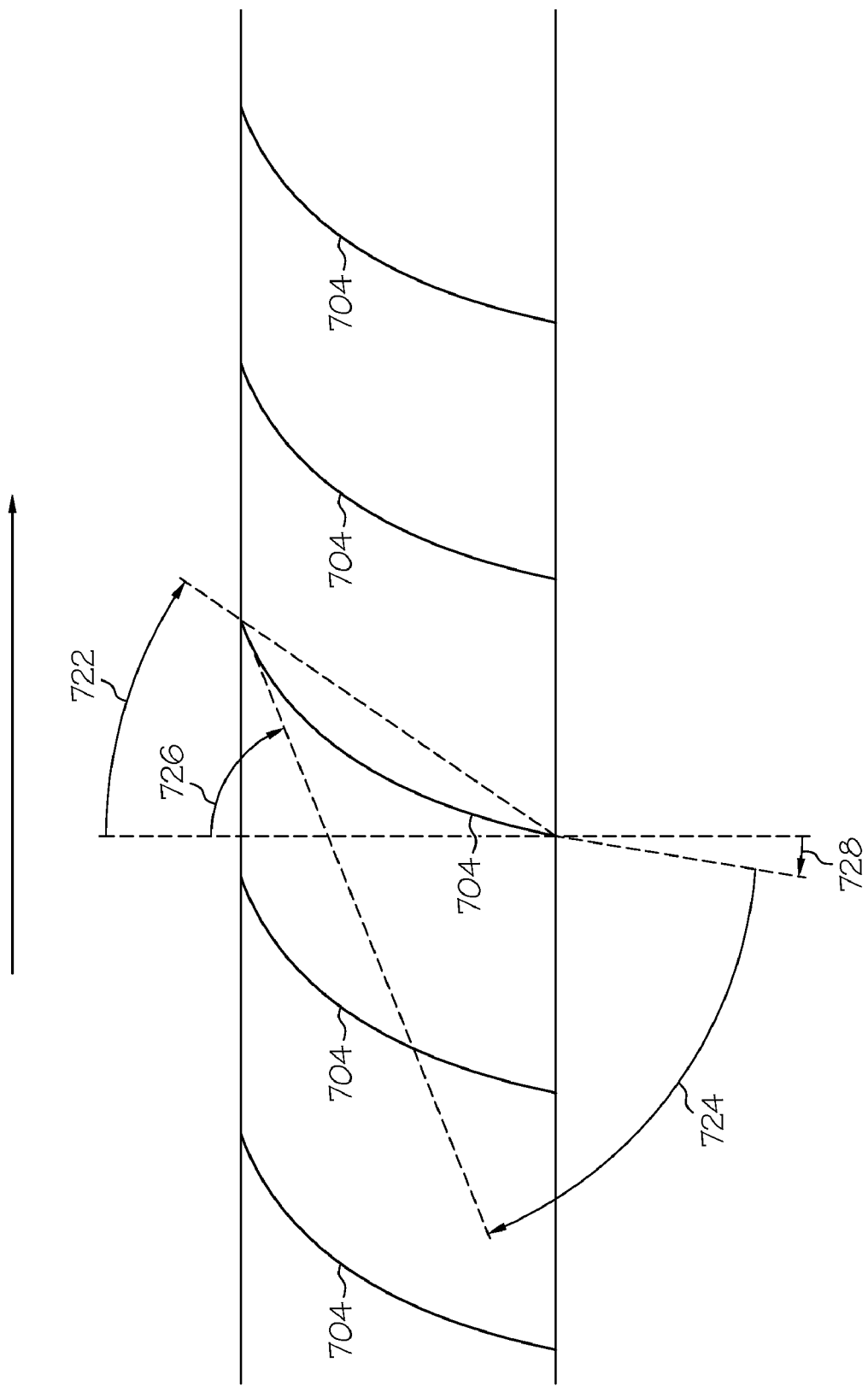
FIG. 7 is a two-dimensional view of the inner axial fins for the enhanced flow discouraging system of FIG. 3, according to an embodiment.

FIG. 7 is a two-dimensional view of the inner axial fins 704 of the enhanced flow discouraging system 300, according to an embodiment. In an embodiment, the inner axial fins 704 have a stagger angle 722, a camber angle 724, and fin angles 726, 728. In an embodiment, the inner axial fins 704 may have a stagger angle 722 in a range of about 0° to about 60°. In other embodiments, the stagger angle 722 may be less than or greater than the aforementioned range. In an embodiment, the inner axial fins 704 may have a camber angle 724 in a range of about 0° to about 45°. In other embodiments, the camber angle 724 may be less than or greater than the aforementioned range. In an embodiment, the inner axial fins 704 may have fin angles 726, 728 in a range of about 0° to about 45°. In other embodiments, the fin angles 726, 728 may be less than or greater than the aforementioned ranges. Further, in an embodiment, one or more of the outer axial fins 704 may have a stagger angle 722 and/or a camber angle 724 that is different from another outer axial fin 704. Further still, in another embodiment, one or more of the individual outer axial fins 704 may have fin angles 726, 728 that are different from the other outer axial fins 704.

Figure 8:
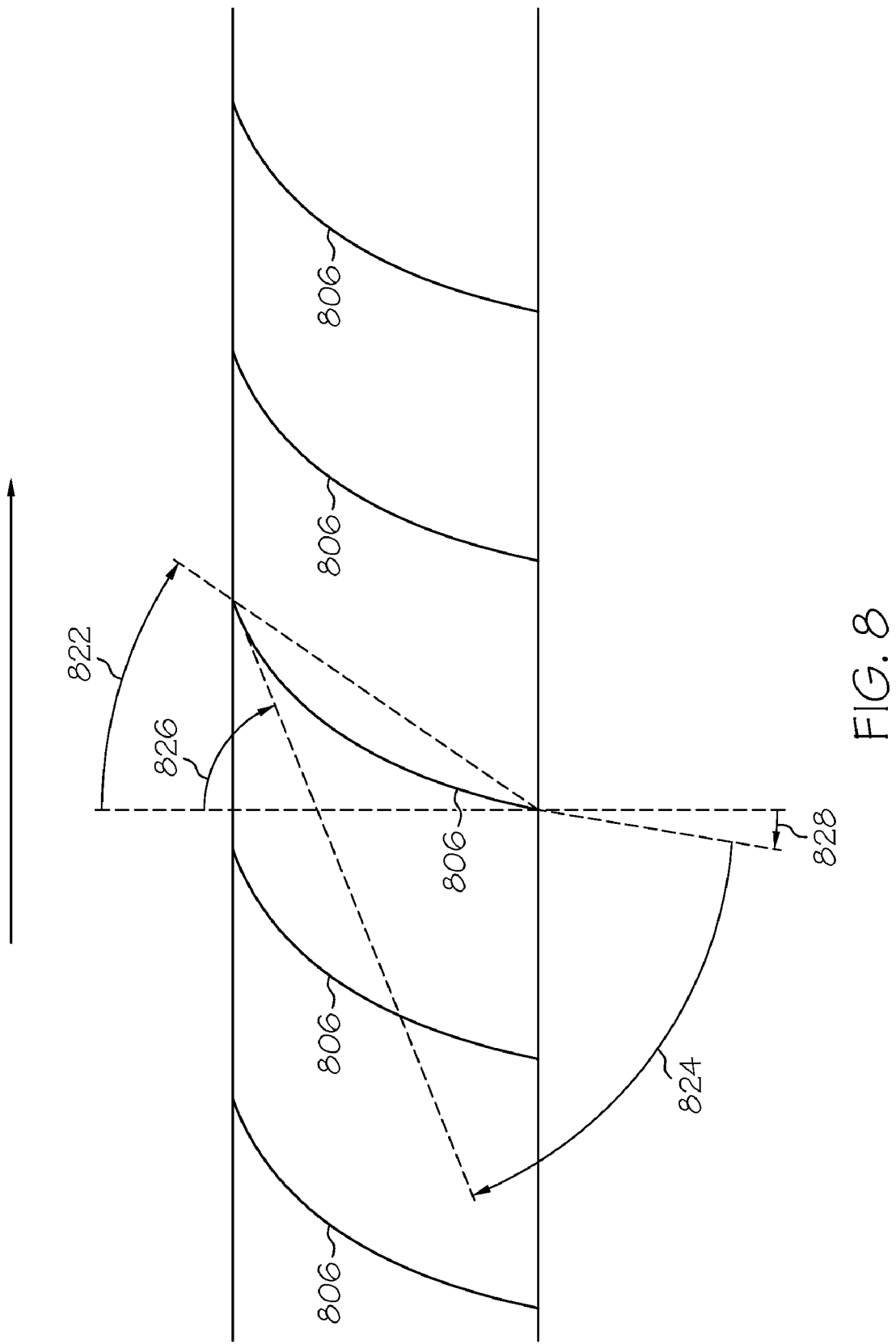
FIG. 8 is a two-dimensional view of the radial fins for the enhanced flow discouraging system of FIG. 3, according to an embodiment.

FIG. 8 is a two-dimensional view of the radial fins 806 of the enhanced flow discouraging system 300, according to an embodiment. Here, the radial fins 806 have a stagger angle 822, a camber angle 824, and fin angles 826, 828, in an embodiment. In another embodiment, the radial fins 806 may have a stagger angle 822 in a range of about 0° to about 60°. In other embodiments, the stagger angle 822 may be less than or greater than the aforementioned range. In an embodiment, the radial fins 806 may have a camber angle 824 in a range of about 0° to about 45°. In other embodiments, the camber angle 824 may be less than or greater than the aforementioned range. In an embodiment, the radial fins 806 may have fin angles 826, 828 in a range of about 0° to about 45°. In other embodiments, the fin angles 826, 828 may be less than or greater than the aforementioned range. Further, one or more of the radial fin 806 may have a stagger angle 822 and/or a camber angle 824 that is different from another one of the radial fins 806, in an embodiment. In another embodiment, one or more of the radial fin 806 may have fin angles 826, 828 that are different from another one of the radial fins 806.

With reference to FIGS. 6, 7 and 8, in an embodiment, the stagger angles 622, 722, 822 may be substantially equal to each other, or they may be different from each other. In another embodiment, the camber angles 624, 724, 824 may be substantially equal to each other, or they may be different from each other. In still another embodiment, the fin angles 626, 726, 826 may be substantially equal to each other, or they may be different from each other. In still yet another embodiment, the fin angles 628, 728, 828 may be substantially equal to each other, or they may be different from each other. In an embodiment, the fins 602, 702, 802 are a uniform thickness in the range of 0.25 mm to 1.25 mm. In other embodiments, the thickness range may be different and/or the thickness may not be uniform.

Returning to FIG. 3, in an embodiment, the outer and inner axial fins 302, 304 and the radial fins 306 may comprise materials capable of withstanding temperatures in a range of about 0° C. to about 1650° C. According to an embodiment, one or more of the outer and inner axial fins 302, 304 and/or the radial fins 306 may comprise components separate from the components defining the side wall 310. For example, the fins 302, 304, 306 may comprise a material that is coupled to the surfaces of the side wall 310. In this regard, the fins 302, 304, 306 may comprise one or more relatively rigid materials, such as titanium, steel alloys, nickel based super alloys or ceramics, in an embodiment. In other embodiments, the fins 302, 304, 306 may comprise one or more materials that are substantially identical to those of the components defining the side wall 310. For example, the fins 302, 304, 306 may comprise titanium, steel alloys, nickel-based super alloys or ceramics. In still other embodiments, the fins 302, 304, 306 may be formed as part of the components defining the side wall 310.

As mentioned briefly above, the rotor assembly extends into the annular groove 308 to form a portion of the enhanced flow discouraging system 300, in an embodiment. The rotor assembly may include an annular rim 320, which may extend from a hub 322 configured to rotate during operation. The annular rim 320 extends partially into the annular groove 308 and may comprise a blade platform of a blade, in an embodiment, or a portion of the hub 322, in another embodiment. A clearance may be included between the annular rim 320 and the axial fins 302, 304 and/or radials 306, in accordance with an embodiment. For example, a clearance from the annular rim 320 to the outer axial fin 302 may be in a range of about 0.25 mm to about 0.65 mm, a clearance from the annular rim 320 to the inner axial fin 304 may be in a range of about 0.25 mm to about 0.65 mm, and a clearance from the annular rim 320 to the radial fin 306 may be in a range of about 0.25 mm to about 0.65 mm. In other embodiments, one or more of the clearances may be greater or less than the aforementioned ranges.

Figure 9:
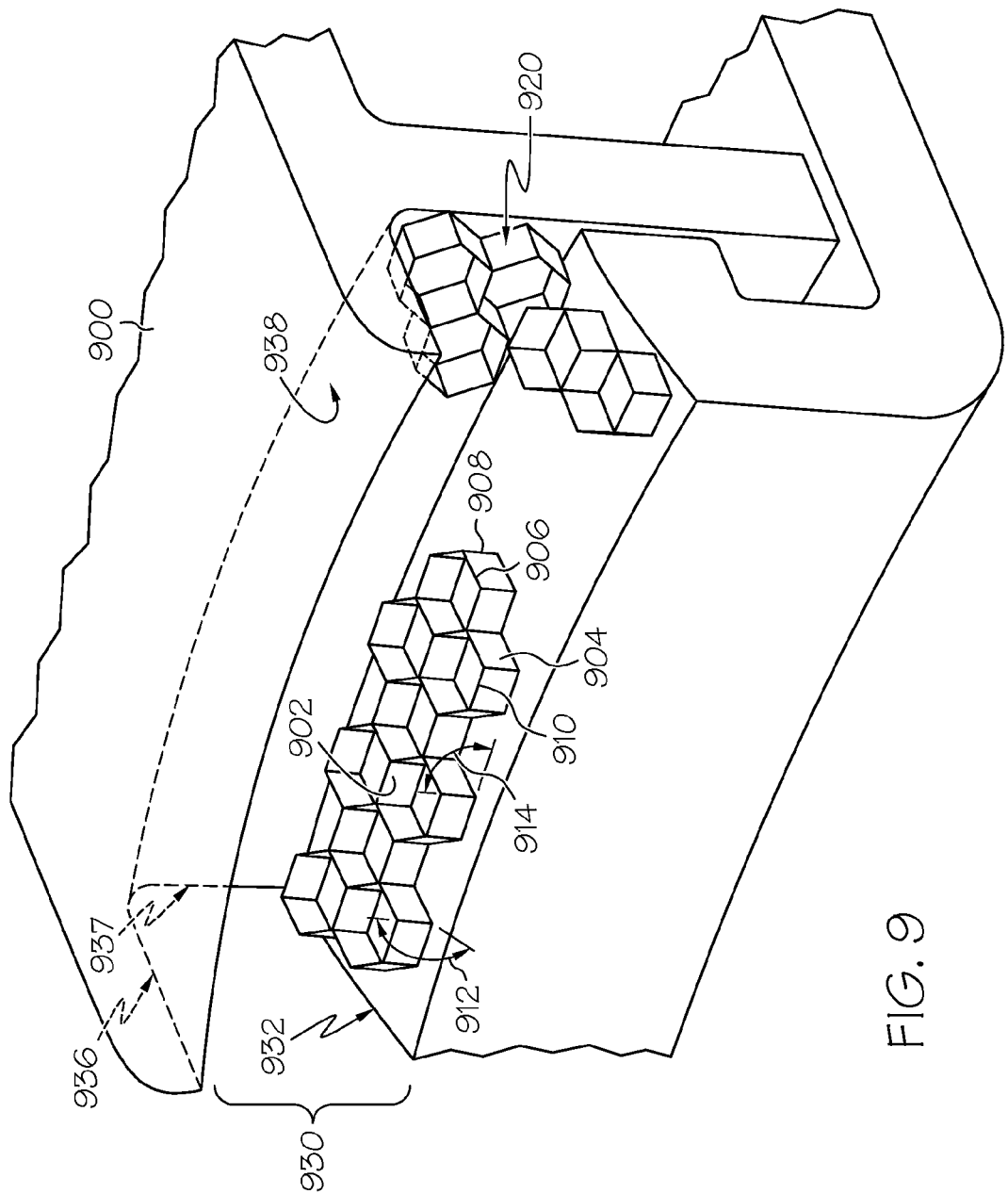
FIG. 9 is a three-dimensional view of honeycomb used for an enhanced flow discouraging system, according to an embodiment.

FIG. 9 is a three-dimensional view of the enhanced flow discouraging system 900, according to an embodiment. In an embodiment, the flow discouraging system 900 includes a plurality of fins that are arranged to form a honeycomb structure 902. The honeycomb structure 902 may comprise a light weight structure including inner axial fins 904, outer axial fins (not shown), and radial fins 920. In an embodiment, the inner axial fins 904 are disposed in an annular groove 930 and extend along an inner axially-extending surface 932 of a side wall 934 defining the annular groove 930, and the inner axial fins 904 are arranged in a honeycomb structure to form repetitive and symmetrical patterns on the inner axially-extending surface 932. In another embodiment, the outer axial fins are disposed in the annular groove 930 and extend along an outer axially-extending surface 936 of the side wall 934 in a honeycomb structure to form repetitive and symmetrical patterns. The outer axial fins may be configured similar to inner axial fins 904 and radial fins 920. In still another embodiment, the radial fins 920 are disposed in the annular groove 930 and arranged in a honeycomb structure to form repetitive and symmetrical patterns on a radial surface 938 of the side wall 934. According to an embodiment, each of walls comprising the honeycomb structure 902 may comprise very thin sheet-metal having a thickness 906 in a range of about 0.05 mm to about 0.10 mm. In other embodiments, the fin wall thickness 906 may be greater or less than the aforementioned range. In an embodiment, a honeycomb fin height 908 may be in the range of 1.9 mm to 4.7 mm. In other embodiments, the fin height 908 may be greater or less than the aforementioned range. In an embodiment, a single wall making up a honeycomb cell 910 may have a size in a range of about 0.5 mm to about 3.0 mm. In other embodiments, the cell size may be greater or less than the aforementioned range. The fins 904, 920 may be tilted in various directions, depending on how the honeycomb is cut. In an embodiment, the fins 904, 920 can be tilted in an axial direction 912, at an angle relative to a surface from which the fin extends in a range of 45 degrees to 135 degrees. In other embodiments, the tilt could be greater or less than the aforementioned range. In an embodiment, the fins may be tilted in a circumferential direction 914 at an angle relative to the surface from which the fin extends in a range of 30 degrees to 150 degrees. In other embodiments, the angle could be greater or less than the aforementioned range.

The honeycomb structure 902 may operate by reducing the velocity of the ingested hot combusted air as it flows through a flow discourager by producing a stagnation pressure loss and a local static pressure rise. The static pressure rise produces a back pressure effect near a fish-mouth opening (e.g., exit opening 280 of FIG. 2), which may reduce both an amount of hot combusted air ingested into a cavity (e.g., cavity 258 of FIG. 2) and an amount of cooling air escaping from the cavity (e.g., cavity 258) into the main flowpath. Because the honeycomb structure 902 may include a relatively thin-walled structure, the honeycomb may be more tolerant of rubs (or contact) with a rotating blade platform (e.g., platform 244) than other type of fin structures. As a result, the flow discouraging effect may be enhanced by allowing the honeycomb-to-blade platform gap to be reduced to near zero (limited only to assembly clearance requirements of a few thousandths of a millimeter) producing increased blockage via reduced overall physical flow area at the fish-mouth region.

A surface of the honeycomb structure may be easily to sculpted by electro-discharge machining processes (EDM) to form surface textures, including but not limited to serrations (e.g. saw tooth shape) and castellations (e.g., circumferential blocks), which may further enhance the flow discouraging effect by reducing and diffusing the ingested hot combusted air, as well as the cooling flow. In an embodiment, the honeycomb structure may be implemented into regions where gas temperature may be relatively low (e.g., below 1100° C.) to prevent oxidation of the honeycomb During engine operation, hot combusted air flows from the combustion section (e.g., combustion section 106 or 206) to the turbine section (e.g., turbine section 108 or 208). Cooling air is supplied to the cavity 258 between the stator assembly of the combustion section (e.g., nozzle 210) and the rotor assembly of the turbine section (e.g., turbine wheel assembly 224), purging the cavity 258 and then proceeding to the exit opening 280 between the stator assembly and the rotor assembly. As the hot combusted air flows over the enhanced flow discouraging system 300, the cooling air maintains the components at a temperature that is lower than that of the hot combusted air and reduces the likelihood of hot combusted air being ingested into the cavity 258. In particular, when the hot combusted air flows through the nozzle 210, a high velocity flow field is created, which passes over the exit opening 280 of the cavity 258. Because the flow discourager is disposed radially inward relative to the exit opening 280, an actual flow allowed into the cavity 258 may be limited, and the axial/radial velocity components of the ingested hot combusted air may be diminished. By including the enhanced flow discouraging system 300, the tangential velocity component of the ingested hot combusted air may be diminished or minimized. Specifically, the enhanced flow discouraging system 300 may create a back pressure at or near the exit opening 280 to reduce the likelihood of hot combusted air ingestion into the cavity 258. Specifically, the fins 302, 304, 306 convert the tangential velocity component of the hot combusted air into a local static pressure rise, or backpressure, through an aerodynamic process of stagnation pressure loss and diffusion. Additionally, the back pressure created by the flow discourage system 300 may discourage cooling air from escaping into the main flowpath 201.

Moreover, the enhanced flow discouraging system 300 may also deter the cooling air in the cavity 258 from flowing into the main flowpath 201, which may be particularly important for embodiments that are implemented into small gas turbines where seal (e.g., seals 296, 298) clearances may not be capable of being made small enough to obtain a desired amount of cooling flow. Rather than supplying an overabundance of cooling air to the cavity 258 than desired, which may increase fuel consumption and may have a detrimental effect on the TOBI system, the enhanced flow discouraging system 300 may deter the cooling air from leaving the cavity 258 at the exit opening 280 to provide a more robust cooling system and thereby protect the blade 228 from thermal damage.

The flow discourager enhancement devices that have been described above may enhance any/all types of flow discouraging systems where a cavity is relatively small (e.g., less than 10 mm in width) and where there is high energy tangential flow within the flow discouraging system which can be utilized to create an "aerodynamic seal", when the enhancements are added to the flow discouraging system. Although specific geometric configurations, dimensions and orientations have been discussed with regard to a basic non-enhanced flow discourager system, the enhancement devices discussed may be applied to a variety of basic non-enhanced flow discourager systems, with various geometric configurations, dimensions and orientations, which may not have been discussed. Additionally, although specific geometric configurations, dimensions and orientations have been discussed with regard to the enhancements themselves, enhancements with geometric configurations, dimensions and orientations, which may not have been discussed, would also be applicable. The enhancements may be applied to a non-rotating portion of the non-enhanced flow discourager system and may be generally oriented with the basic non-enhanced flow discourager system to create a relatively uniform clearance between the enhancement and a rotating portion of the non-enhanced flow discourager system. Some modification of a basic non-enhanced flow discourager system may be included to accommodate the enhancements to provide a desired running clearance. In alternative embodiments, the inventive subject matter may be included in a cavity between two static structures 286. In this case, the cavity 286 may comprise a design feature to protect a ceramic shroud 230 from the outer ring 214 of the nozzle 210. Because two static structures form the cavity 286, the inventive subject matter may be applied to both static structures. In still other embodiments, for the inventive subject matter may be implemented in other sections 288 in which a sufficient amount of high energy tangential flow exists.

Although discrete fins and honeycomb structures have been discussed individually, various combinations of these enhancements can also be envisioned, in an embodiment. Moreover, although the stator assembly and rotor assembly are described as comprising components from a combustion section and a turbine section of an engine, respectively, adjacent components from other sections of the engine 200 may alternatively be employed. Specifically, the enhanced flow discouraging system 300 may be implemented between various sections in which a non-rotating structure is disposed adjacent to a rotating structure. In any case, inclusion of the enhanced flow discouraging system 300 provides a passive system, not subject to wear with time, for reducing compressor bleed air flow that may be used to cool engine components, which, in turn, may minimally affect engine fuel consumption. Additionally, because the axial fins 302, 304 and/or the radial fins 306 may be separate components, the enhanced flow discouraging system 300 may be relatively simple and/or inexpensive to implement into existing engines, as compared to an entire redesign of an engine. Alternatively, because honeycomb may be separate components, flow discouraging system enhanced in this way may be relatively simple and/or inexpensive to implement into existing engines, as compared to an entire redesign of an engine.

While at least one exemplary embodiment has been presented in the foregoing detailed description of the inventive subject matter, it should be appreciated that a vast number of variations exist. It should also be appreciated that the exemplary embodiment or exemplary embodiments are only examples, and are not intended to limit the scope, applicability, or configuration of the inventive subject matter in any way. Rather, the foregoing detailed description will provide those skilled in the art with a convenient road map for implementing an exemplary embodiment of the inventive subject matter. It being understood that various changes may be made in the function and arrangement of elements described in an exemplary embodiment without departing from the scope of the inventive subject matter as set forth in the appended claims.

What is claimed is:

1. A flow discouraging system, comprising:
a stator assembly including one or more stationary components forming a side wall, the side wall including an annular groove defined by an outer axially-extending surface, an inner axially-extending surface, and a radial surface extending between the outer and inner axially-extending surfaces;
one or more outer axial fins disposed in the annular groove and extending along the outer axially-extending surface of the side wall;
one or more inner axial fins disposed in the annular groove and extending along the inner axially-extending surface of the side wall;
one or more radial fins disposed in the annular groove extending axially from the radial surface of the side wall; and
a rotor assembly disposed adjacent to and spaced apart from the stator assembly to form a portion of a cavity, the rotor assembly including an annular rim extending at least partially into the annular groove and disposed between the one or more outer axial fins and the one or more inner axial fins.

2. The system of claim 1, wherein:
the stator assembly and the rotor assembly are surrounded by a main flowpath;
the main flowpath is adapted to receive a first gas flow from a combustion section; and
the cavity is adapted to receive a second gas flow from a compressor section.

3. The system of claim 1, wherein the one or more outer axial fins are spaced substantially evenly around the annular groove.

4. The system of claim 1, wherein the one or more inner axial fins are spaced substantially evenly around the annular groove.

5. The system of claim 1, wherein one or more of the outer axial fins and one or more of the inner axial fins are radially aligned with each other.

6. The system of claim 1, wherein one or more of the outer axial fins and one or more of the inner axial fins extend substantially parallel to a centerline of the stator assembly.

7. The system of claim 1, wherein the one or more radial fins are spaced substantially evenly around the annular groove.

8. The system of claim 1, further comprising a cover coupled to the rotor assembly, wherein the cover has a radial plate including an axial flange extending from the radial plate to define a portion of the cavity.

9. The system of claim 8, wherein the side wall is configured to complement a surface of the radial plate including the axial flange to define a torturous flowpath in the cavity.

10. The system of claim 1, wherein at least one of the one or more of outer axial fins, the one or more of inner axial fins, and the one or more of radial fins are arranged to form a honeycomb structure.

11. The system of claim 1, wherein the one or more stationary components comprises a nozzle including a stationary vane.

12. The system of claim 1, wherein the one or more stationary components comprises an inner ring of a nozzle.

13. A gas turbine engine, comprising:
a compressor section;
a combustion section adjacent to the compressor section; and
a turbine section adjacent to the combustion section, the turbine section including:
a stator assembly including one or more stationary components forming a side wall, the side wall including an annular groove defined by an outer axially-extending surface, an inner axially-extending surface, and a radial surface extending between the outer and inner axially-extending surfaces;
a plurality of outer axial fins disposed in the annular groove and extending along the outer axially-extending surface of the side wall;
a plurality of inner axial fins disposed in the annular groove and extending along the inner axially-extending surface of the side wall;
a plurality of radial fins disposed in the annular groove extending axially from the radial surface of the side wall;
a rotor assembly disposed adjacent to and spaced apart from the stator assembly to form a portion of a cavity, the rotor assembly including an annular rim extending at least partially into the annular groove and disposed between the outer axial fin and the inner axial fin, and the cavity in flow communication with the compressor section; and
a main flowpath surrounding the stator assembly and the rotor assembly, the main flowpath in flow communication with the combustion section.

14. The system of claim 13, wherein the plurality of outer axial fins and corresponding inner axial fins of the plurality of inner axial fins are radially aligned with each other.

15. The system of claim 13, wherein the plurality of radial fins are spaced substantially evenly around the annular groove.

16. The system of claim 13, further comprising a cover coupled to the rotor assembly, wherein the cover has a radial plate including an axial flange extending from the radial plate to define a portion of the cavity.

17. The system of claim 16, wherein the side wall is configured to complement a surface of the radial plate including the axial flange to define a torturous flowpath in the cavity.

18. The system of claim 13, wherein the one or more stationary components comprises a nozzle including a stationary vane.

19. The system of claim 13, wherein the rotor assembly comprises a turbine wheel assembly.

* * * * *